July 29, 1969  P. EPPENBERGER  3,457,880
DOUGH MOLDING PRESS

Filed May 27, 1966  9 Sheets-Sheet 1

INVENTOR.
Paul Eppenberger

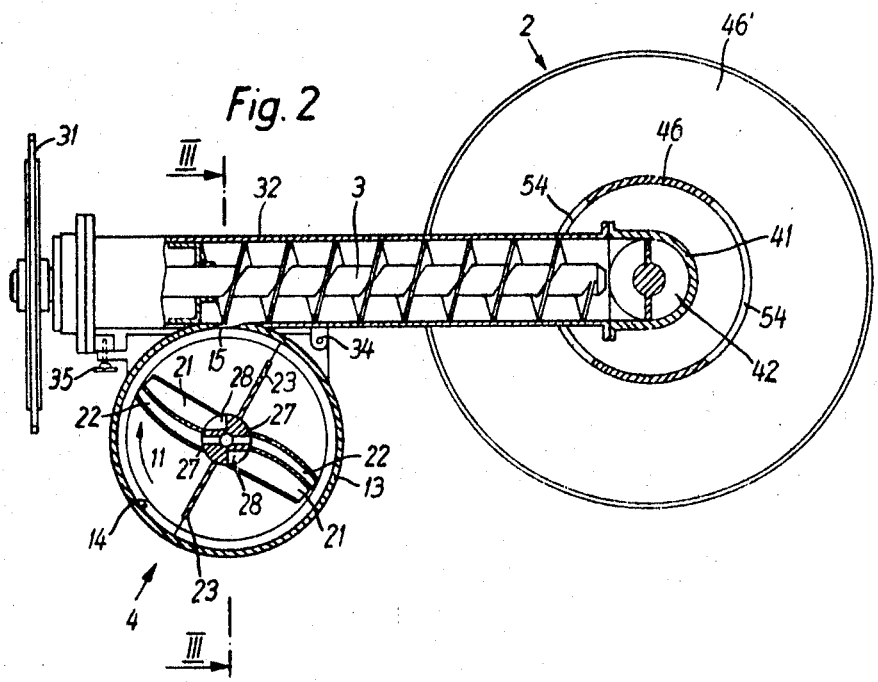
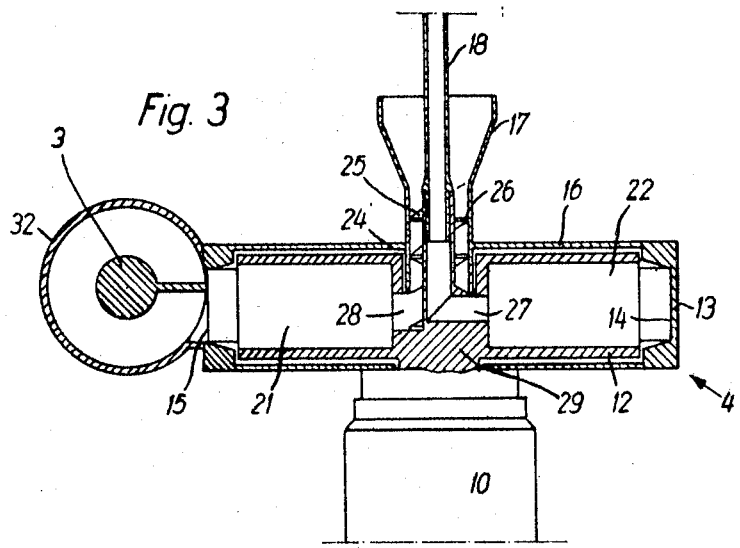

July 29, 1969 P. EPPENBERGER 3,457,880
DOUGH MOLDING PRESS
Filed May 27, 1966 9 Sheets-Sheet 3

INVENTOR.
Paul Eppenberger

July 29, 1969     P. EPPENBERGER     3,457,880
DOUGH MOLDING PRESS

Filed May 27, 1966     9 Sheets-Sheet 6

INVENTOR.

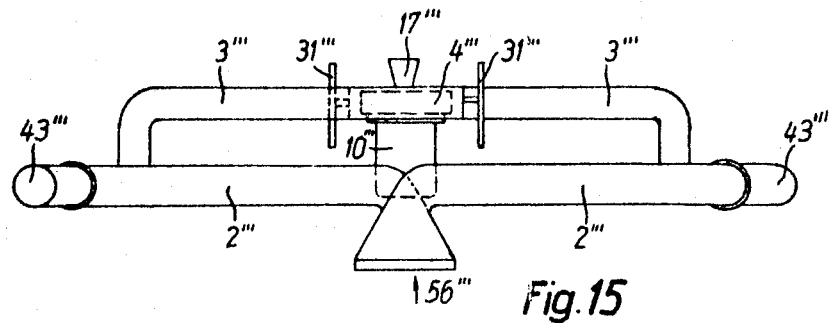
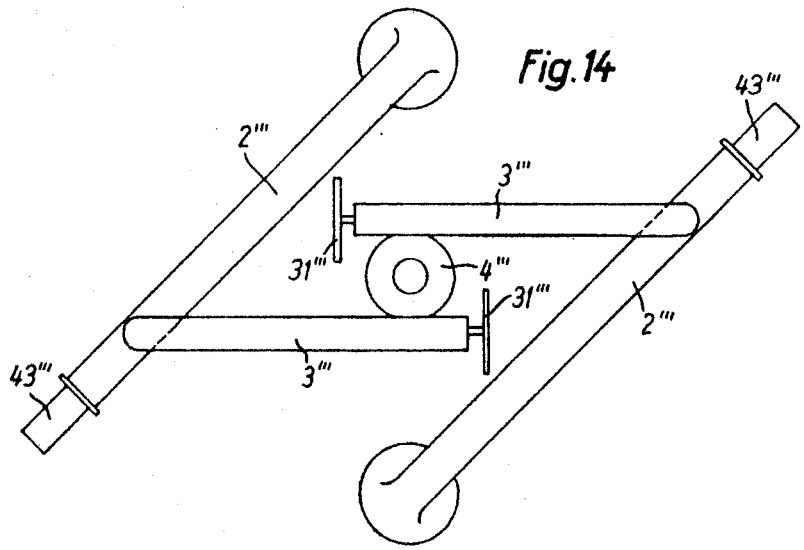

INVENTOR.
Paul Eppenberger
BY McGlew & Toren

United States Patent Office 3,457,880
Patented July 29, 1969

3,457,880
DOUGH MOLDING PRESS
Paul Eppenberger, Auenhofen, Amriswil, Thurgau, Switzerland, assignor to Gebruder Buhler, Uzwil, Saint Gall, Switzerland
Filed May 27, 1966, Ser. No. 561,674
Claims priority, application Switzerland, May 28, 1965, 7,420/65; Sept. 24, 1965, 13,240/65
Int. Cl. A21c 11/16, 1/00; B01f 15/00
U.S. Cl. 107—14                                    44 Claims

ABSTRACT OF THE DISCLOSURE

A dough molding press includes an extruder forcing the mixture of components constituting the dough through an apertured mold, and a mixer arranged in advance of the extruder and including centrifuging means and a mixing surface. The centrifuging means centrifuges the components of the mixture onto the mixing surface as relatively thin superposed layers. The extruder comprises a pressing cylinder and a pressing screw rotatably mounted in the pressing cylinder, and a feed cylinder extends between the mixer and the pressing cylinder and has a feed screw rotatably mounted therein.

Background of the invention

This invention relates to dough molding presses in which an extruder forces the dough through an apertured mold. More particularly, the present invention is directed to an improvement in dough molding presses in which a centrifugal mixer is positioned ahead of the extruder and effective to provide a very rapid and effective mixing of the components.

In the manufacture of alimentary paste, the present machines mix semolina and water, possibly together with flour, powdered egg and any additives, by metering the several components into a rotating vane-type continuous mixing machine which mixes the components and feeds the mixture to the extruder. These vane-type mixers are now used almost exclusively, and permit the production of alimentary paste of good quality.

In presently used mixers, the contact of the mixture components fed thereto is of such a nature that a certain amount of water will contact a certain amount of semolina. However, not all of the semolina grains come immediately into contact with the water. Nodules are formed, which are greatly wetted on the outside but whose inner grains have not yet come into contact with the water. The rotating vane- or paddle-type mixer cuts these nodules and kneads the resulting dough, while a moisture equalization occurs. The migration of water from one grain to the other is, however, very slow.

Tests have shown that the main loss of pigments of the raw material in the production of alimentary pastes occurs in the rotating vane-type mixer. In special cases, which may be required, for example, due to the nature of the raw material, a small vane-type mixer can be interposed to supplement the kneading action, but it is only a fraction of the size of the present mixer.

It has already been suggested that a dough molding press for alimentary products be built using a centrifugal mixer. However, the particular mixer proposed was not effective because the components came into contact at or adjacent the axis of the mixer. Thus, the wetting was left more or less to coincidence and the fact that this centrifugal mixer was not effective has turned the attention of the designers away from the though of using a centrifugal mixer as the main mixer of a dough molding press.

An object of the present invention is to provide a dough molding press having substantial advantages over known dough molding presses.

Another object of the invention is to provide a dough molding press in which a mixer is arranged ahead of the extruder and includes centrifuging means and a mixing surface on which the components are distributed as superposed layers.

A mixer of this type has already been proposed, but there has been no indication of its possible uses. Since the present vane-type mixer takes ten to fifteen minutes to mix the components thoroughly, there has been no reason to consider it possibe that a special centrifugal-type mixer could achieve a satisfactory mixing effect in a fraction of a second. The special consistency and strength of the product at the outlet of a vane-type mixer does not suggest that a centrifugal mixer could be used in place of the vane-type mixer and act in such a short time on separately supplied grains and liquids while still being able to produce a suitable starting product for the extruder.

A further object of the invention is to provide a rapidly and effectively acting mixer for dough molding presses.

Yet another object of the invention is to provide a centrifugal-type mixer for dough molding presses and having the advantage of small dimensions. Thereby, fewer ingredients are in the mixer and cleaning is facilitated. In stoppages, it is advantageous that only a small amount of the product is in the machine.

A further object of the invention is to provide a centrifugal mixer for dough molding machines and which can feed the product mixture directly to the extruder.

A further object of the invention is to provide, in an extruder in the form of a vertical oriented pressing screw, a coupling sleeve whereby the pressing screw or worm serves as centering means for the transmission so that the assembly is very simple and there are no bracing forces.

Yet another object of the invention is to provide an extruder of the type just mentioned in which the axis forces during operation are absorbed by suitable supporting means for the coupling sleeve.

A further object of the invention is to provide such an extruder including a special suspension for the pressing screw or worm making easy the assembly and disassembly of the latter.

Still another object of the invention is to provide a dough molding press in which, at the outlet end of the feed screw or worm, means are provided for narrowing the flow cross section for the dough whereby the dough is subjected to substantial kneading not only in the extruder but also by the feed worm assembly. This has the further advantage that pre-kneaded dough is fed to the extruder, and the kneading of the dough in the feed screw assembly is particularly favorable where the dough is supplied to the assembly from a centrifugal-type mixer.

An ancillary object of the present invention is to provide means for returning paste waste through a special opening provided in the cylinder for the feed screw, and which is in communication with a pneumatic conveyor.

Another ancillary object of the invention is to provide a dough molding machine in which two extruders are connected to a single mixer for providing, within a small space, a press having a very high output and in which the distribution of the product between the two extruders is particularly uniform.

For an understanding of the principles of the invention, reference is made to the following description of typical embodiments thereof as illustrated in the accompanying drawings.

In the drawings:

FIG. 2 is a horizontal sectional view of the apparatus shown in FIG. 1, taken along the axis of the feed screw or worm;

FIG. 3 is a vertical sectional view through a centrifugal mixer and the feed screw or worm, taken along the line III—III of FIG. 2;

FIG. 14 is a plan view of a further embodiment of the invention with two feed screws or worms being fed from a common centrifugal mixer;

FIG. 15 is a side elevational view corresponding to FIG. 14;

Figure 1:
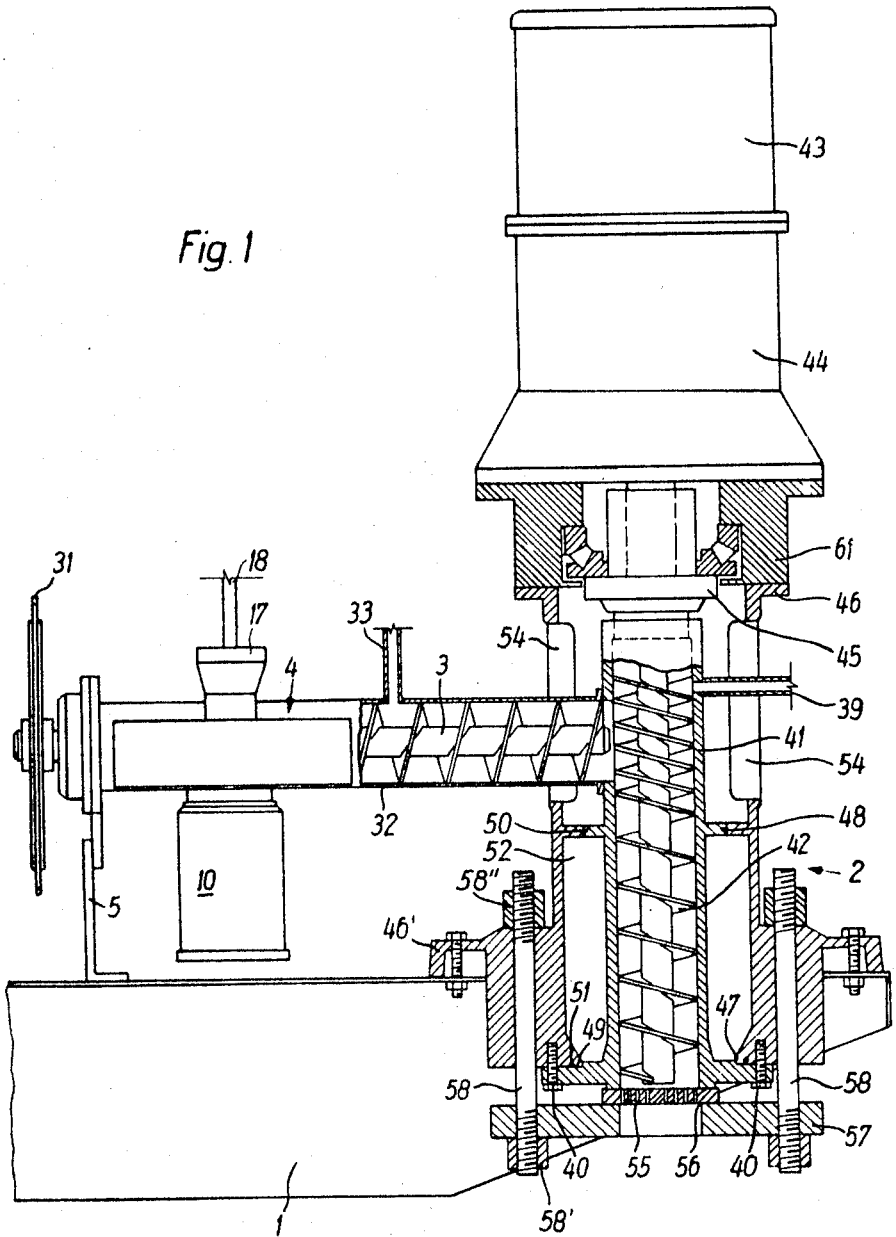
FIG. 1 is a somewhat schematic vertical sectional view, along the axes of a feed screw or worm and an extruder screw or worm, of one form of apparatus embodying the invention.

Referring first to FIGS. 1 through 5, the apparatus therein shown includes a frame 1 on which is mounted an extruder 2 which is supplied from a feed screw or worm means 3 in turn supplied from a mixer 4. Feed screw means 3 has one end mounted on extruder 2 and another end mounted or supported on bracket 5 on frame 1. In FIG. 3, the rotor 12 of mixer 4 is illustrated as driven by a motor 10 in the direction of arrow 11 of FIG. 2, rotor 12 having a hub 29 secured on the output shaft of motor 10. This rotor is rotatably mounted in the housing 13 whose cylindrical rotor 12 is suitably rotatably supported in housing 13 having a cylindrical inner surface 14 formed with a discharge slot 15, the housing 13 having a relatively short axial length and a relatively large diametrical length. An annular cover or closure plate 16 closes the upper end of housing 13 and supports a stationary hopper 17 for a granular component of the mixture, and also supports a stationary feed pipe 18, for a liquid component, which extends centrally through hopper 17.

Referring more particularly to FIG. 2, rotor 12 is provided with two sets of centrifuge ducts 21, 22, the two sets extending in diametrically opposite directions from hub 29 and the ducts 21 and 22 being fixedly mounted on hub 29. Intermediate the sets of ducts 21, 22, hub 29 supports strippers 23 extending in opposite directions from the hub, the arrangement being such that the duct sets alternate with the strippers. Rotor 12 further includes a central pipe 24 which is rotatably telescoped over the lower part of stationary pipe 18, as indicated at 25, and forms a seal with the latter. A feed screw or worm 26, turning in the stationary hopper 17, is secured on pipe 24, and pipe 24 is connected by bores 27 with the centrifuge ducts 22. Similarly, hopper 17 is connected, by recesses 28 in the hub 29 of rotor 12, with centrifuge ducts 21.

Feed screw or worm 3 is chain or gear driven by means of a sprocket 31, and rotates in the feed cylinder 32 which is provided with a suction pipe 33 for connection to a source of vacuum. The discharge slot 15 in housing 13 of mixer 4 serves to feed the mixed material to feed worm 3, whose feed cylinder 32 opens into the press cylinder 41 of extruder 2. Mixer 4 may be swung away from feed cylinder 32 about a pivot 34, but is held in operative association with the feed cylinder by a releasable holding screw 35.

Figure 4:
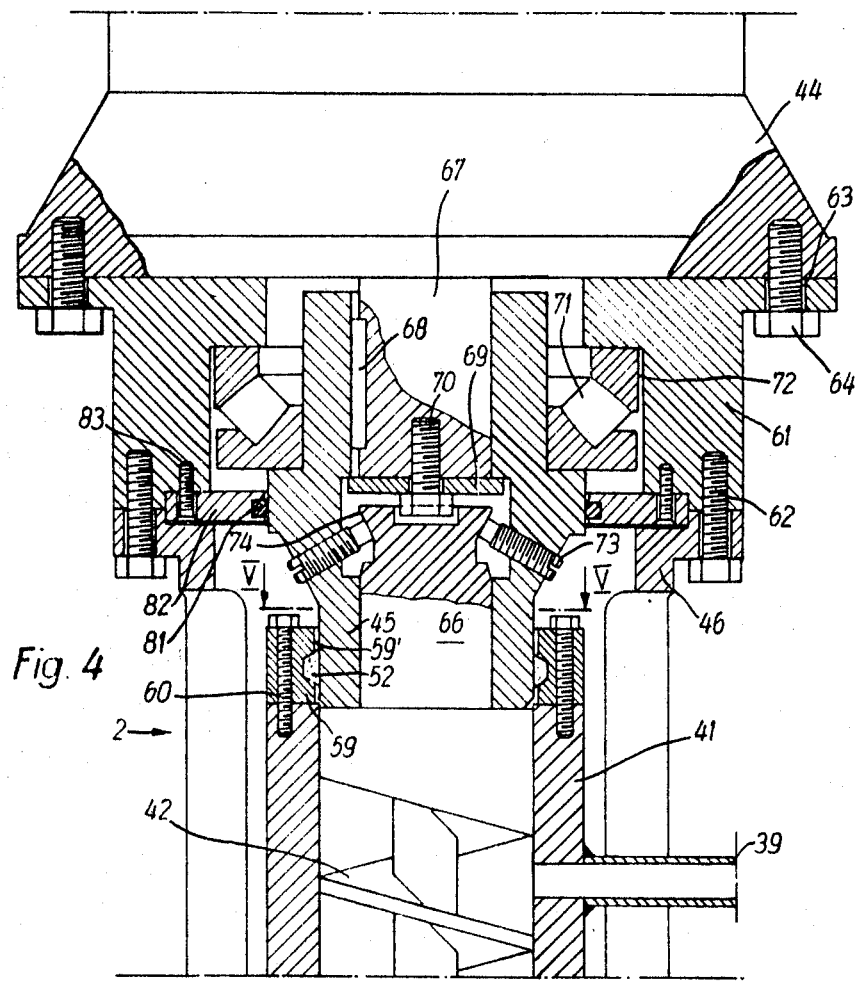
FIG. 4 is a sectional view illustrating a portion of FIG. 1 to a larger scale.

Extruder 2 includes a pressing screw or worm 42 which is rotatably centered in a press cylinder 41 having a suction pipe 39 connected thereto for applying a vacuum to the interior of the press cylinder. Worm 42 is driven by a motor 43 from a transmission 44 through a coupling sleeve 45, as best seen in FIG. 4. Press cylinder 41 is centered in a supporting housing 46, secured on frame 1, to be in engagement with housing 46 at two axially spaced cylindrical mating surfaces 47 and 48, of which the lower surface 47 is provided with an axial stop or abutment surface 49. The upper surface 48 is provided with a packing 50, and there is a packing 51 on the axial stop surface 49. An annular chamber 52 thus formed between cylinder 41 and housing 46 serves to stabilize the temperature of press cylinder 41.

The extruder screw or worm 42 forces the material through a pattern plate 56 provided with a number of apertures 55. Pattern plate 56 is held against the lower part of press cylinder 41 by pattern plate holder 57 which is braced, relatively to supporting housing 46, by means of tension rods 58 having tightening nuts 58′ and 58″. Screws 40 secure press cylinder 41 to supporting housing 46, and housing 46 is provided with a lateral opening 54 for feed cylinder 32 rotatably supporting the feed worm 3. Above supporting housing 46, as best seen in FIG. 4, there is a bearing box 61 secured thereto by screws 62, and the transmission 44 is secured to bearing box 61 by screws 64 which have radial clearances 63 with respect to bearing box 61. Supporting housing 46 itself is rigidly connected with frame 1 through the medium of support 46′, which is bolted to frame 1 as shown in FIG. 1.

Figure 5:
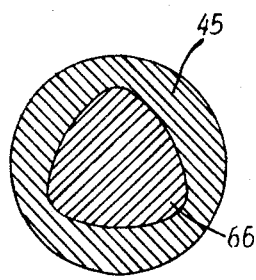
FIG. 5 is a sectional view taken on the line V—V of FIG. 4.

Referring to FIGS. 4 and 5, in order to center the coupling sleeve 45 and to transmit the torque, the shaft of worm 42 has a connection portion 66 which has a mating fit within sleeve 45, the two coupling parts having a generally polygonal shape, illustrated as a triangle having arcuate sides. Adjacent its other end, coupling sleeve 45 is drivingly connected with drive shaft 67 through a key 68, for torque transmission. Drive shaft 67 is concentrically supported in transmission 44, and this drive shaft, and thus transmission 44, are centered by coupling sleeve 45. Sleeve 45 is supported in a transverse roller bearing 71 arranged in bearing box 61, and bearing 71 has a radial clearance 72 with respect to bearing box 61.

Coupling sleeve 45 is suspended by a disk 69 and a screw 70 from the drive shaft 67. In turn, pressing worm 42 is suspended on coupling sleeve 45 by screws 73 threaded radially through sleeve 45 and extending obliquely to its axis, these screws 73 engaging a conical extension 74 on press worm 42. A packing 52 for worm 42 is arranged in a ring 59 connected by screws 60 with pressing cylinder 41, and a packing 81 for sleeve 45 is arranged in a disk 82 secured by screws 83 on bearing box 61, and which centers the supporting housing 46 and bearing box 61 with each other.

The apparatus so far described operates in the following manner. Referring to FIGS. 2 and 3, rotor 12 turns at a high speed in the direction of arrow 11, and the premeasured semolina is delivered continuously to feed hopper 17 and carried along by the rotating feed worm 26 for conveying through recesses 28 into centrifuge ducts 21. In ducts 21, the metered or dosed semolina is distributed over the entire height thereof and is centrifuged as a uniform thin layer onto the cylindrical inner surface 14 of mixer 4. The water, which is likewise continuously metered or dosed, is delivered through stationary feed pipe 18 into rotary pipe 24 and flows from pipe 24 through bores 27 into the centrifuge ducts 22 where it is distributed over the entire height of these ducts. The water is thrown as a thin layer on the already centrifuged semolina layer, so that an excellent hydration of the semolina is effected. Thus, as each centrifuge duct 21 deposits a respective layer of semolina onto the surface 14, this layer of semolina immediately has a layer of water deposited thereon by the duct 22 of the same set. Thereafter, the pair of superposed layers, one comprising the semolina and the other comprising the water, are stripped off by the stripper 23 immediately following the respective set of ducts 21 and 22. Thus, each layer of semolina is followed immediately by a layer of water and the two layers are thereafter scraped off by the following stripper 23 in advance of deposition of the next layer of semolina followed by the next layer of water.

Each resulting two-layer intimate mixture formed by a respective set of ducts 21, 22 is thus carried along by the following stripper 23 and discharged through slot 15 into feed cylinder 32 where it is carried along by feed worm 3 with a kneading action. The suction pipe 33, connected to a vacuum system, provides for effecting the vacuum treatment customary in dough molding presses. The mixture of components constituting the dough arrives in press cylinder 41, where it can likewise be subjected to a vacuum treatment through suction pipe 39. In press cylinder 41, the product is pressed by press screw or worm 42 under high pressure through apertures 55 of pattern plate 56. The various extrusions are cut, by suitable means (not shown), and dried.

Press worm 42 is centered by press cylinder 41, and coupling sleeve 45 is centered by the coupling connection 66 with respect to press worm 42. On the other hand, coupling sleeve 45 centers drive shaft 67 and thus transmission 44. Since radial clearances 63 and 72 are provided for screws 64 and roller bearing 71, respectively, there are no bracing forces. Press worm 42 transmits the axial forces to coupling sleeve 45 and thus to transverse roller bearing 71 and bearing box 61, thereby relieving transmission 44.

When the machine is idle, press screw or worm 42 is suspended on coupling sleeve 45 by screws 73. By loosening these screws, worm 42 can be removed from press cylinder 41. In order to provide for disassembly of coupling sleeve 45, it is necessary to remove screws 70 and the associated disk 69.

To prevent roller bearing 71 from falling or sliding out after coupling sleeve 45 has been removed, a disk 82 is provided. This disk does not center coupling sleeve 45 but it has the packing 81. Packing 52 is arranged in a ring 59 which is secured by screws 60 on press cylinder 41 and has a clearance 59' with respect to coupling sleeve 45. To disassemble press cylinder 41, pattern plate holder 57 and pattern plate 56 are removed, first, by loosening clamping bolts 58. After loosening screws 40, press cylinder 41 can be removed simply by pulling it out from the supporting housing 46.

Of course, it is possible to provide mixer 4 with additional feeding devices and centrifuge ducts so that several granular components can be added in the mixing process, for example, and also floury and powdered components may be added. The liquid components generally can be pre-mixed and enter the mixer jointly through the feed pipe 18.

Figure 6:
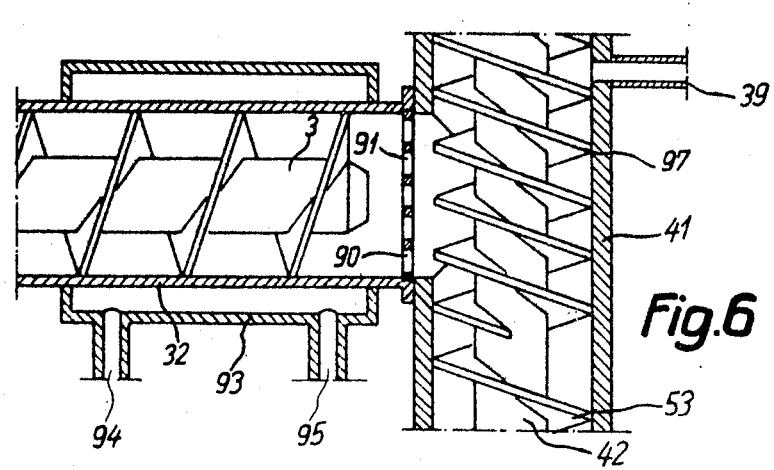
FIGS. 6, 7, 8 and 9 are vertical sectional views, on the screw or worm axes, through alternative embodiments of the invention.

In the embodiment of the invention shown in FIG. 6, a throttle plate 90 having apertures 91 is provided at the outlet end of feed cylinder 32 in which feed worm 3 rotates. A thermo-stabilizing jacket 93, with connection nipples 94, 95, is arranged about feed cylinder 32 and is connected to a water cycle with automatic temperature regulation, which has not been shown in the drawings. Press worm 42 rotating in press cylinder 41 has, in the ejection range of feed worm 3, a double worm 97. A single worm thread 53 forms the extension of multiple worm thread 97, which latter can have a pitch different from that of worm thread 53. Press cylinder 41 has the suction pipe 39 arranged thereon.

In the embodiment of FIG. 6, throttle plate 90 causes an additional resistance for dough passing therethrough. This produces, in feed worm 3, a pressure increase in the dough resulting in an increased kneading action in feed worm 3, which effects a temperature rise in the dough. The thermo-stabilizing jacket 93 provides for controlling the temperature of the dough ahead of throttle plate 90. Double worm thread 97 of worm 42 divides the dough pieces before they are conveyed further and, by virtue of this, it is possible to effect a very good vacuum treatment through suction pipe 39. The dough, flowing under pressure through throttle plate 90, prevents entrance of atmospheric air into press cylinder 41. The substitution of throttle plates 90 having larger or smaller apertures 91, or formed with a different number of apertures, has the advantage that the intensity of the kneading action effected by feed worm 3 can be varied in a simple manner and adapted to the raw materials to be processed.

Figure 7:
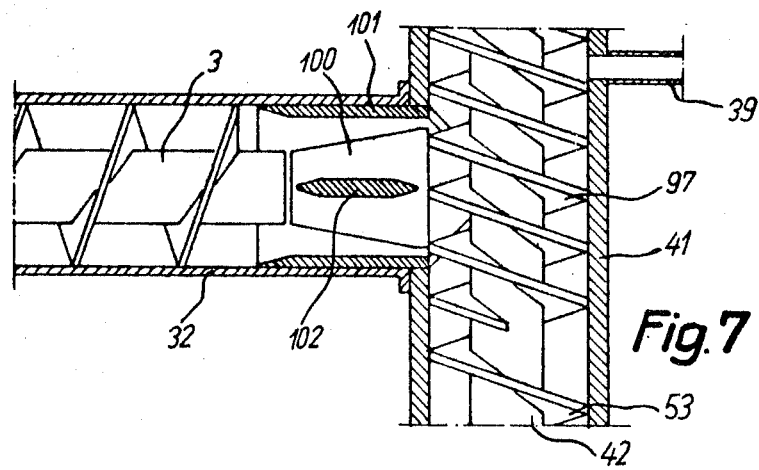

In the embodiment of the invention shown in FIG. 7, a stationary truncated cone 100 is positioned upstream of the outlet end of feed worm 3, and has its larger diameter facing away from feed worm 3. A cylinder 101, which is connected with cone 100 by several supports 102, is inserted in feed cylinder 32. The pressure increase in the feed worm can be varied, in a simple manner, by using a smaller or larger cone 100.

Figure 8:
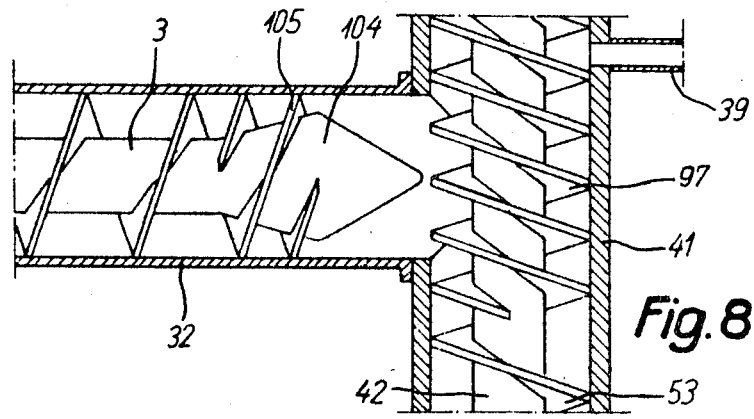

In the embodiment of the invention shown in FIG. 8, feed worm 3 has a double cone 104 at its discharge end, this cone narrowing the flow cross section for the dough. In part of the length of the double cone 104, there is provided a double worm thread 105. The pressure end of the worm is centered in feed cylinder 32 by the symmetry of the worm thread 105. Due ot the double cone 104, the dough undergoes a back pressure at the pressure end of the worm.

Figure 9:
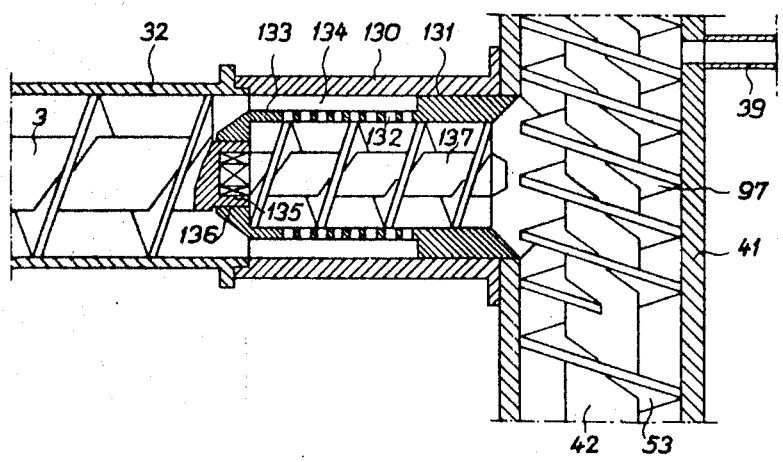

In the embodiment of the invention shown in FIG. 9, an extension cylinder 130 is connected to feed cylinder 32, and cylinder 130 communicates with press cylinder 41. A stationary throttle cylinder 133 is arranged in cylinder 130 and is centered by means of fitting surface 131, and is further formed with substantially radial apertures 132. An annular duct 134 accommodates passage of the dough and acts as entrance to the exterior surface of throttle cylinder 133. Feed worm 3 has a journal 135 which is rotatably mounted in a bore 136 of throttle cylinder 133, this mounting serving as a packing. A single thread worm 137 on journal 135 rotates in throttle cylinder 133.

Feed worm 3 forces the dough into annular duct 134 and thence through apertures 132 of cylinder 133. Worm 137 divides the dough pieces and conveys them in loosened form to press cylinder 41. In the embodiment of FIG. 9, a large surface of the divided dough pieces can be subjected to the vacuum treatment through the suction pipe 39, also shown in FIG. 1, because the vacuum is effective, through the apertures 132, inside throttle cylinder 133. A multiple thread worm could be positioned in throttle cylinder 133 to divide the dough into shorter pieces so that an even larger surface of the dough is obtained.

Figure 10:
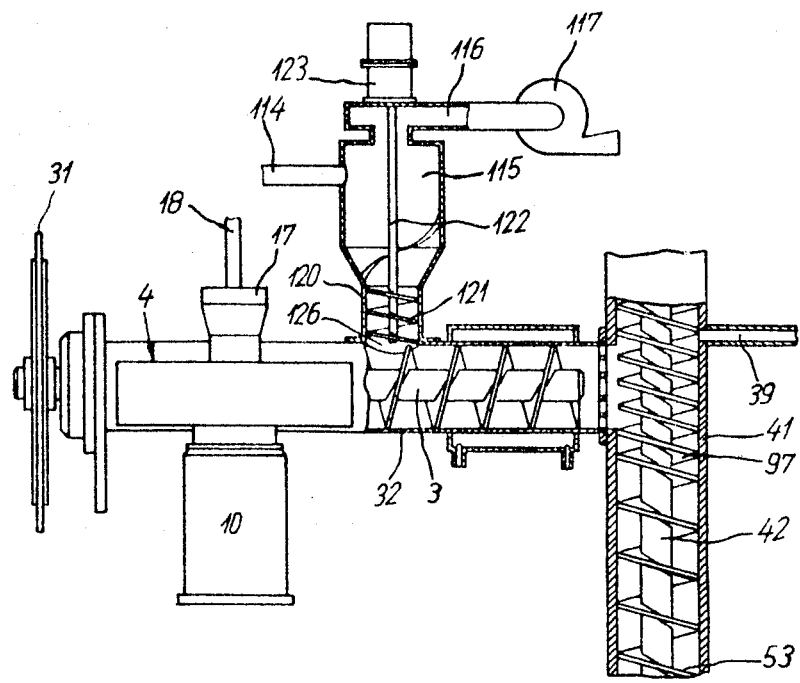
FIG. 10 is a view similar to FIG. 1, but illustrating a pneumatic waste return system connected to the feed conveyor.

FIG. 10 illustrates an embodiment of the invention including a pneumatic conveyor comprising a conveyor line 114, a cyclone separator 115 and a line 116 connecting cyclone separator 115 to a blower 117. A waste return housing 120 is connected to cycline 115, and has a waste return worm 121 rotating therein. A drive shaft 122 extends centrally through cyclone 115 to connect worm 121 with a drive 123. Feed cylinder 32 has an opening 126 communicating with waste return housing 120. The arrangement of FIG. 10 provides for conveying the paste waste from the means for cutting the molded paste extrusions to the feed worm 3.

Figure 11:
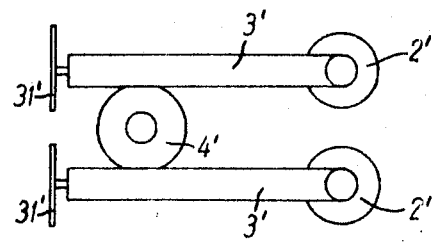
FIG. 11 is a plan view of a further embodiment of the invention including two parallel feed screws or worms and a common centrifugal mixer.
Figure 12:
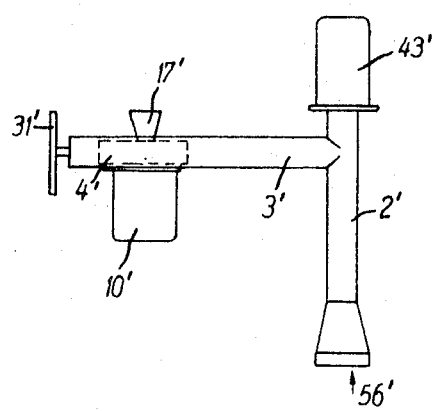
FIG. 12 is a side elevational view corresponding to FIG. 11.

In the modification shown in FIGS. 11 and 12, two extruders 2' are connected through respective feed screw or worm assemblies 3', driven by sprockets 31', to a common centrifugal mixer 4'. In this embodiment, the product is discharged from centrifugal mixer 4' through two apertures (not shown) into feed worms 3', 3', so that material is fed uniformly to extruders 2'. FIGS. 11 and 12 represent one way in which a simple press with a doubled output can be obtained following the principles of the present invention. Though each extruder 2' has been shown as having its own apertured mold, die or pattern plate 56', both extruders can work on a common oblong pattern plate, for example, for the production of long pastes or for winding.

Figure 13:
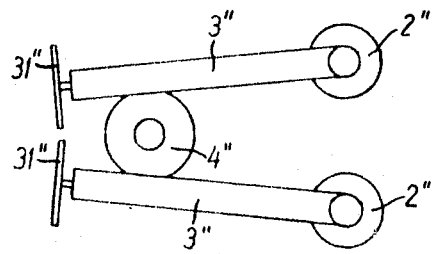
FIG. 13 is a view similar to FIG. 2, but illustrating the feed screws or worms as non-parallel.

The embodiment of FIG. 13 differs from that of FIGS. 11 and 12 in that the feed worms 3", driven by sprockets 31", do not extend parallel to each other, this arrangement permitting the extruders 2" to be arranged the desired distance from each other by virtue of the non-parallel arrangement of feed worms 3".

In FIGS. 14 and 15, extruders 2''' are designed as horizontal press worms. Feed worms 3''', driven by sprockets 31''', are arranged in communication with centrifugal mixer 4''', extending on opposite sides of the latter. A complete symmetry of the feeding into the feed worm is thus obtained. Extruders 2''' are mounted obliquely relative to the feed screws, and their heads can thus be arranged at any desired spacing. Each extruder 2''' is illustrated as having its own apertured mold, die, or pattern plate 56'''.

Figure 16:
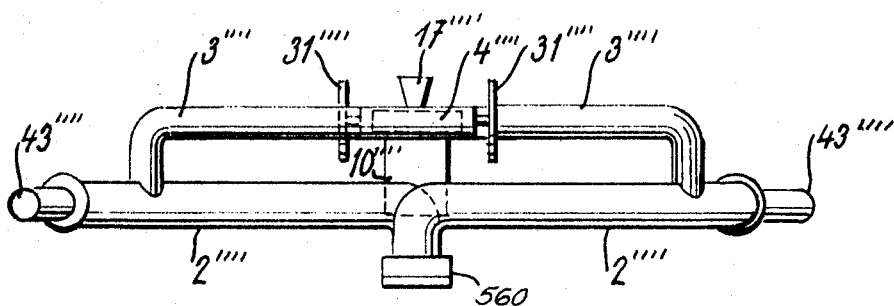
FIG. 16 is a side elevational view of a further embodiment of the invention in which two feed screws supply a common mold.
Figure 17:
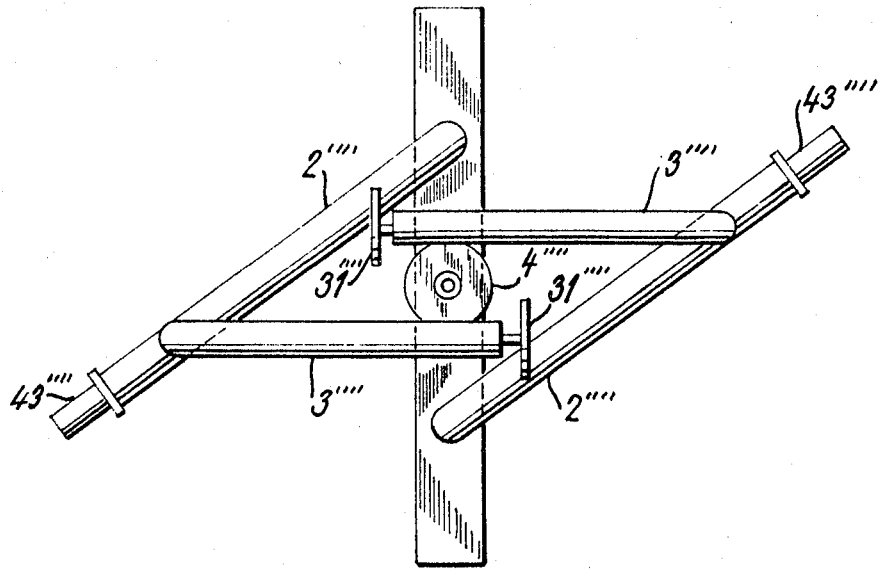
FIG. 17 is a plan view corresponding to FIG. 16.

FIGS. 16 and 17 illustrate an embodiment of the invention in which two extruders 2'''' discharge into a common mold 560. Feed screws or worms 3'''' extend in parallel relation, but in opposite directions from mixer 4'''' and discharge into the respective extruders 2''''. Feed screws 3'''' are driven by common driving means connected to respective sprockets 31'''', and respective motors 43'''' drive the extruders 2''''. Motor 10'''' drives mixer 4''''.

What is claimed is:

1. In a dough molding press including an extruder forcing the mixture of components constituting the dough through an apertured die, the improvement comprising a mixer arranged in advance of the extruder; said mixer including centrifuging means and a mixing surface; said centrifuging means centrifuging the components of the mixture on said surface as relatively thin superposed layers.

2. In a dough molding press, the improvement claimed in claim 1, in which said extruder comprises a pressing cylinder and a pressing screw rotatably mounted in said pressing cylinder.

3. In a dough molding press, the improvement claimed in claim 2, including a feed cylinder extending between said mixer and said pressing cylinder; and a feed screw rotatable in said feed cylinder.

4. In a dough molding press, the improvement claimed in claim 3, in which said mixer discharges into said feed cylinder for feeding of the mixture by said feeding screw to said pressing cylinder for feeding by the pressing screw to force the mixture of components constituting the dough through the apertures of said die.

5. In a dough molding press, the improvement claimed in claim 4, in which said mixer is a centrifuge having a rotor with a vertical axis.

6. In a dough molding press, the improvement claimed in claim 2, including means operable to connect the interior of said pressing cylinder to a source of vacuum.

7. In a dough molding press, the improvement claimed in claim 3, including means operable to connect the interior of said feed cylinder to a source of vacuum.

8. In a dough molding press, the improvement claimed in claim 3, in which said pressing screw has a vertical axis and said feed screw has a horizontal axis.

9. In a dough molding press, the improvement claimed in claim 3, including flow restricting means at the discharge end of said feed screw in said feed cylinder effectice to narrow the flow cross section for the fed material.

10. In a dough molding press, the improvement claimed in claim 9, in which said flow restricting means comprises a throttle plate having apertures for passage of dough therethrough.

11. In a dough molding press, the improvement claimed in claim 9, in which said flow restricting means comprises a truncated cone having its larger base further from said feed screw.

12. In a dough molding press, the improvement claimed in claim 11, including a cylinder interchangeably insertable in said feeding cylinder and having at least one support for said truncated cone.

13. In a dough molding press, the improvement claimed in claim 9, in which said flow restricting means comprises a double cone on the discharge end of said feeding screw.

14. In a dough molding press, the improvement claimed in claim 13, including a double screw thread extending through at least part of the axial length of said double cone.

15. In a dough molding press, the improvement claimed in claim 9, in which said flow restricting means comprises an extension cylinder connected to the discharge end of said feed cylinder; and a cylindrical throttle plate within said extension cylinder and defining therewith an axially elongated annular space; said cylindrical throttle plate having radial apertures therethrough for dough passage.

16. In a dough molding press, the improvement claimed in claim 15, including a single thread screw rotatably mounted in said cylindrical throttle plate.

17. In a dough molding press, the improvement claimed in claim 16, including means connecting said last-named screw to said feed screw.

18. In a dough molding press, the improvement claimed in claim 3, in which said pressing screw, in the region adjacent said feed screw, is provided with a double screw thread.

19. In a dough molding press, the improvement claimed in claim 18, in which said double screw thread of said pressing screw has a pitch different from the remainder of the thread of said pressing screw.

20. In a dough molding press, the improvement claimed in claim 3, including a thermo-stabilizing jacket extending around said feed cylinder; said jacket having connection means for circulation of a thermo-stabilizing medium therethrough.

21. In a dough molding press, the improvement claimed in claim 3, in which said feed cylinder is provided with an opening; and means operable to return waste dough into said feed cylinder through said opening.

22. In a dough molding press, the improvement claimed in claim 21, in which said last-named means comprises a waste dough return housing communicating with said opening; and a waste dough return screw rotatably mounted in said housing.

23. In a dough molding press, the improvement claimed in claim 22, including a pneumatic conveying means connected to said housing; said pneumatic conveying means comprising a conveyor line, a cyclone, a blower, and means connecting said cyclone to said blower.

24. In a dough molding press, the improvement claimed in claim 23, in which said housing extends from one axial end of said cyclone; drive means at the other axial end of said cyclone; and a drive shaft extending axially of said cyclone and connecting said drive means to said waste dough return screw.

25. In a dough molding press, the improvement claimed in claim 8, including a drive shaft for said pressing worm adjacent the upper end of the latter; a coupling sleeve rotatable with said drive shaft and coupled to said pressing screw to transmit the driving torque to the latter; a housing enclosing said coupling sleeve; and a radial thrust bearing for said coupling sleeve in said housing for transmitting the axial pressure thereto to keep the drive pressure-free.

26. In a dough molding press, the improvement claimed in claim 25, including means secured to the end of said drive shaft and engageable with said coupling sleeve to retain said coupling sleeve against vertical displacement downwardly relative to said drive shaft.

27. In a dough molding press, the improvement claimed in claim 26, including means on said coupling sleeve engaged with said pressing screw and restraining said pressing screw against axial displacement relative to said coupling sleeve.

28. In a dough molding press, the improvement claimed in claim 27, in which said last-named securing means comprises an inverted conical extension on the upper end of said pressing screw; and screws threaded through said coupling sleeves at an angle to the axis thereof and engaging said inverted conical extension.

29. In a dough molding press, the improvement claimed in claim 25, including means on said housing restraining said bearing from falling out of said housing upon removal of said coupling sleeve.

30. In a dough molding press, the improvement claimed in claim 25, in which said drive shaft is centered by said pressing screw through said coupling sleeve.

31. In a dough molding press, the improvement claimed in claim 25, including a packing within said pressing cylinder engaged with said coupling sleeve.

32. In a dough molding press, the improvement claimed in claim 8, including a supporting housing surrounding said pressing cylinder; said pressing cylinder having two axially spaced cylindrical bearing surfaces engaged with said supporting housing and, adjacent the discharge end of said extruder, an axial bearing surface engaging said supporting housing.

33. In a dough molding press, the improvement claimed in claim 32, including packings disposed between said two axially spaced cylindrical bearing surfaces and said supporting housing and a packing disposed between said axial bearing surface and said supporting housing.

34. In a dough molding press, the improvement claimed in claim 32, in which said supporting housing has an axially extending opening therethrough for removal of said pressing cylinder therefrom.

35. In a dough molding press, the improvement claimed in claim 4, including hinge means connecting the housing of said mixer to said feed cylinder whereby said mixer may be pivoted away from said feed cylinder.

36. In a dough molding press, the improvement claimed in claim 25, including a supporting housing coaxial with and surrounding said pressing cylinder: an annular disk secured to the housing for said bearing and centered on said supporting housing and a seal disposed between the inner periphery of said annular disk and said coupling sleeve.

37. In a dough molding press, the improvement claimed in claim 3, including a pair of dough feeding screws connected to said mixer.

38. In a dough molding press, the improvement claimed in claim 37, in which said pair of screws extend in converging-diverging relation to each other.

39. In a dough molding press, the improvement claimed in claim 37, in which said dough feeding screws are a pair of feed screws extending from said mixer.

40. In a dough molding press, the improvement claimed in claim 39, in which said screws have vertical axes.

41. In a dough molding press, the improvement claimed in claim 39, in which said screws have horizontal axes.

42. In a dough molding press, the improvement claimed in claim 37, in which said screws extend in opposed directions from said mixer.

43. In a dough molding press, the improvement claimed in claim 42, in which said screws are feed screws extending in parallel relation but in opposed directions from said mixer; and a pair of extruders each connected to a respective feed screw, each of said extruders extending at an acute angle to the associated feed screw.

44. In a dough molding press, the improvement claimed in claim 43, including a common mold connected to the discharge ends of said two extruders.

References Cited

UNITED STATES PATENTS

| | | |
|---|---|---|
| 1,790,347 | 1/1931 | Hawkins. |
| 2,026,667 | 1/1936 | Braibanti et al. |
| 2,712,799 | 7/1955 | Braibanti et al. |
| 3,017,854 | 1/1962 | O'Brien _____ 107—7 X |
| 3,051,454 | 8/1962 | Goos et al. _____ 259—6 |
| 3,059,595 | 10/1962 | Locatelli. |
| 3,216,375 | 11/1965 | Ernst. |
| 2,896,556 | 7/1959 | Sippel et al. _____ 107—30 |
| 2,996,022 | 8/1961 | McCashen. |
| 3,198,142 | 8/1965 | Lothes _____ 107—30 |

FOREIGN PATENTS

| | | |
|---|---|---|
| 568,093 | 3/1945 | Great Britain. |

WILLIAM I. PRICE, Primary Examiner

JOSEPH SHEA, Assistant Examiner

U.S. Cl. X.R.

107—30; 259—8